Sept. 21, 1937.  A. R. STEIRLY  2,093,662

PUMP VALVE

Filed Sept. 27, 1934

INVENTOR.
A. R. STEIRLY
BY Jesse R. Stone
Lester B. Clark
ATTORNEYS

Patented Sept. 21, 1937

2,093,662

UNITED STATES PATENT OFFICE 2,093,662

PUMP VALVE

Albert R. Steirly, Houston, Tex.

Application September 27, 1934, Serial No. 745,776

6 Claims. (Cl. 251—127)

The invention relates to an improved slush pump valve.

One of the objects of the invention is to provide a slush pump valve in which the force of the fluid pressure is carried by a metallic valve and transmitted to the valve seat at a sufficient number of points so that distortion of the seat is eliminated.

It is an object of the invention to provide a metallic valve whose upper surface is of a substantially spherical contour, and is arranged to receive a resilient valve disc.

It is a further object to provide a metallic valve and a resilient valve disc having interfitting ridges and grooves.

It is a further object to provide a metallic valve whose upper surface is of a substantially spherical contour and which is associated with a tapered valve seat so as to form an upwardly flaring annular groove into which sealing material may be pressed by the fluid pressure.

It is also an object to provide a resilient sealing member for a tapered valve seat which is initially spaced from the tapered seat but which may be pressed into engagement with said seat by the fluid pressure.

It is another object of the invention to provide in combination with a convex metallic valve plate a resilient valve disc which is adapted to engage the plate and also to contact with a valve seat and to overlie the upper rim of said valve seat.

It is an object to provide a valve in which a metallic valve plate seats both on a tapered valve seat and on a spider structure so that the load on the metallic valve is distributed.

It is an object to provide a valve stem and disc assembly wherein a tapered fit between the two is formed, and wherein the two parts may be secured together by welding.

These and further objects will be apparent when the following description is considered with the accompanying drawing wherein.

Figure 1:
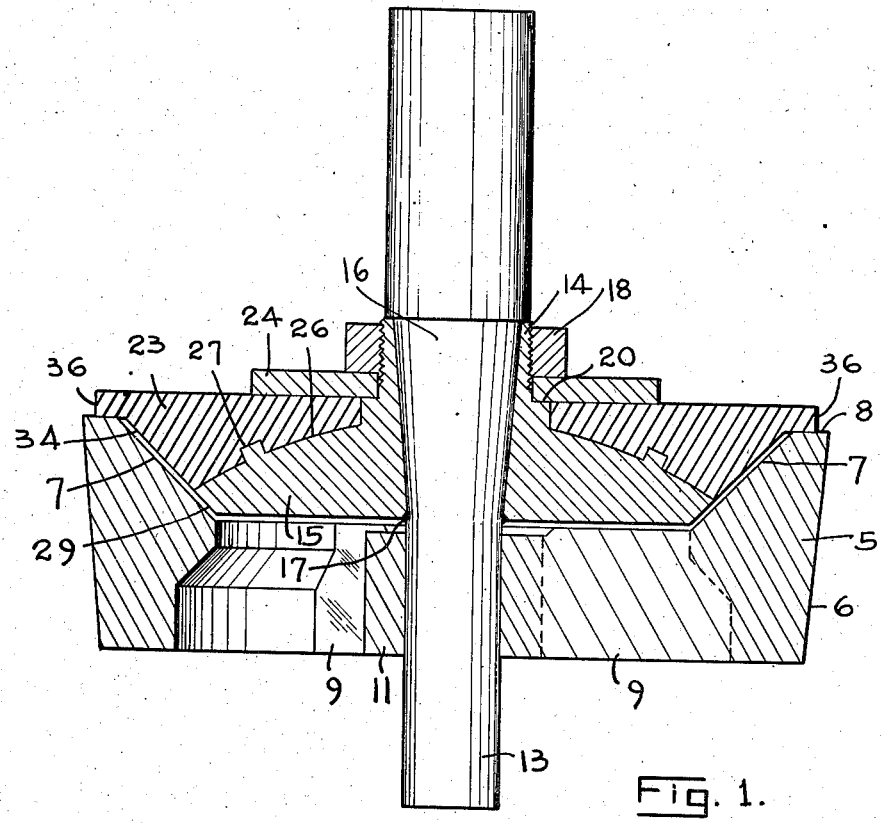
Fig. 1 is a vertical sectional view of a pump valve constructed in accordance with the invention.
Figure 2:
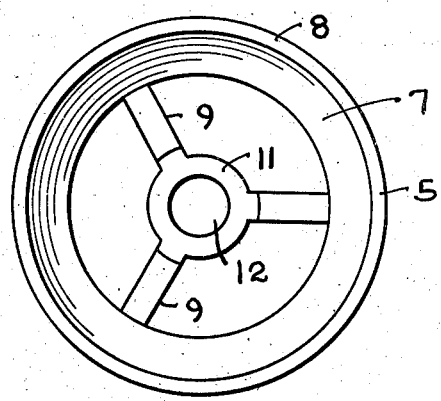
Fig. 2 is a top plan view of a valve ring or seat embodying features of the invention.

The valve comprises a ring or seat 5 whose exterior is downwardly and inwardly tapered as at 6 to be set in a suitable socket in a pump structure. This ring 5 is provided with a downwardly tapered seat 7 whose upper edge terminates at the inner edge of the annular surface 8 on the ring. A spider is formed in the ring 5 consisting of the radial arms 9 and the hub or boss 11, which in turn has a bore 12 therethrough.

The stem 13 of the valve body proper slidably engages the bore 12, and on this stem 13 is arranged the metallic valve disc 15. The tapered portion 16 of the valve stem is received by a corresponding tapered socket in the disc 15 and the two are united by welding at points 17.

The valve disc 15 is provided with a threaded portion 14 to receive a nut such as 18.

A resilient sealing member comprising a gasket 23 of resilient material is carried by the valve body and is held thereon by the washer 24 and the nut 18.

The washer 24 bears on the shoulder 20 of the valve disc 15 so that its travel is limited and the compression of the rubber disc 23 will not be excessive.

It will be observed that the upper face 26 of the flange or metallic disc 15 is of a general spherical contour and is provided with an upstanding annular bead 27 which engages within a groove in the resilient element 23. The bead acts to hold the inner portion of the resilient element or gasket 23 in place. The disc 15 is further provided with a tapered peripheral portion 29 which is adapted to seat on the tapered seat 7 of the seat ring 5. The lower face of the disc 15 engages the top faces of the arms 9 of the spider. Thus it will be seen that the disc 15 is supported around its rim by the contact between the area 29 and the tapered seat 7, and is supported over its lower area by the arms 9 of the spider. This form of support distributes the load to such an extent that distortion of the disc and seat is eliminated. While only three arms for the spider are shown it is contemplated that a sufficient number will be employed to properly support the valve disc.

The sealing gasket 23 has a lower concave area fitting over the upper convex face of the valve disc 15. The body of the gasket projects beyond the outer circumference of the disc 15 and has an outer lip or flange 36 adapted to engage upon the plane upper area 8 of the valve seat ring. The lower side of the gasket inside said lip is tapered downwardly at 34 to fit the tapered seat 7.

As seen in Fig. 1 the parts of the valve are shown in position at the time of first contact between the valve and the seat ring. The flange 36 overlies the area 8 and forms a primary seal when the fluid pressure is applied, and tends to cushion the shock of the valve closure.

The outer portion of the spherical surface 26 and the tapered seat 7 together form an annular wedge shaped groove, and when the fluid pressure is applied the resilient material is compressed and forced into this groove to form a seal. It is apparent that the upper face of the disc 23 will be compressed under the pressure and that the resilient material, preferably rubber, will be squeezed along the spherical surface and into the annular groove.

The downward force on the valve is supported by the metallic disc on the seat 7 and the arms 9 and the rubber element provides a fluid seal between the metallic disc and the seat. The greater portion of this force of closing of the valve is taken by the metallic parts, while the resilient gasket member is thereafter forced to a close sealing position by the fluid pressure exerted upon its upper surface. This gives a flowing movement to the gasket which accomplishes a satisfactory seal under heavy pressure and endures for a long period of time.

What is claimed is:

1. A slush pump valve including a valve ring, a downwardly tapered seat therein, a spider in said ring below said tapered seat, a valve stem slidably engaging said spider, a flange on said stem, said flange being adapted to engage said seat and said spider, the upper face of said flange being of a substantially spherical contour, an annular upstanding bead on said spherical surface, a resilient disc carried by said bead and engaging said spherical surface and said bead, said disc being responsive to applied fluid pressure to be forced into the annular channel formed between said spherical surface and said tapered seat when said valve is in closed position to form a seal therebetween.

2. A resilient valve disc for valves which includes a plane upper face, the lower face having an inner downwardly concave portion, an upwardly and outwardly flaring surface adapted to engage a tapered valve seat and a laterally extending flange above and adjacent the periphery of said flaring surface and adapted to overlie the said valve seat and seal therewith before said flaring surface is engaged.

3. A valve seat ring having a plane upper face and a downwardly tapered seat adjacent thereto, a valve member including a plate tapered to fit said seat and having a convex upper surface, a sealing gasket having a concave area to fit said upper surface of said plate, a tapered portion outside said concave area and a peripheral flange outside said tapered portion to engage said plane face before said tapered portion engages said seat, said tapered portion of said gasket being adapted to be forced by fluid pressure into said seat.

4. A valve for pumps including a valve seat ring, an inner downwardly tapered seat and an outer plane seat on said ring, a valve stem tapered downwardly, a valve plate having a wedging fit over said tapered stem, a guide on said seat ring for said stem, a tapered outer periphery on said plate to engage said tapered seat, an upper convex surface on said plate, a rubber packing gasket fitting upon said convex surface, an outer tapered surface on said gasket to engage said tapered seat, an upper plane face on said gasket perpendicular to the axis of said stem to receive fluid pressure thereon to wedge said gasket downwardly on said convex surface to said tapered seat, a radially extending lip on said gasket to engage said plane seat before contact of the gasket on said tapered seat is made, and means to hold said gasket on said plate.

5. A valve for pumps including a valve seat ring, an inner downwardly tapered seat and an outer plane seat on said ring, a valve stem, a valve plate on said valve stem, a guide on said seat ring for said stem, a tapered outer periphery on said plate to engage said tapered seat, an upper convex surface on said plate, a rubber packing gasket fitting upon said convex surface, an outer tapered surface on said gasket to engage said tapered seat, an upper plane face on said gasket perpendicular to the axis of said stem to receive fluid pressure thereon to wedge said gasket downwardly on said convex surface to said tapered seat, a radially extending lip on said gasket to engage said plane seat before contact of the gasket on said tapered seat is made, and means to hold said gasket on said plate.

6. A valve for pumps including a valve seat ring, an inner downwardly tapered seat and an upper plane seat on said ring above said tapered seat, a valve stem, a valve plate fixed on said stem, a guide on said seat ring for said stem, a tapered outer periphery on said plate to engage said tapered seat, an upper convex surface on said plate, a rubber packing gasket fitting upon said convex surface, an outer tapered surface on said gasket to engage said tapered seat, an upper plane face on said gasket perpendicular to the axis of said stem, and extending radially beyond said plate to receive fluid pressure thereon to wedge said gasket downwardly on said convex surface to said tapered seat, a lip on said gasket positioned to engage said plane seat, and means to hold said gasket on said plate.

ALBERT R. STEIRLY.